(12) United States Patent
Guibene (10) Patent No.: US 12,167,174 B2
(45) Date of Patent: Dec. 10, 2024

(54) METHODS AND SYSTEMS FOR AUTOMATING HOSPITALITY WORKFLOWS

(71) Applicant: Charter Communications Operating LLC, St. Louis, MO (US)

(72) Inventor: Wael Guibene, Parker, CO (US)

(73) Assignee: CHARTER COMMUNICATIONS OPERATING, LLC, St. Louis, MO (US)

(*) Notice: Subject to any disclaimer, the term of this patent is extended or adjusted under 35 U.S.C. 154(b) by 92 days.

(21) Appl. No.: 17/109,780

(22) Filed: Dec. 2, 2020

(65) Prior Publication Data
US 2022/0174244 A1 Jun. 2, 2022

(51) Int. Cl.
*H04N 7/18* (2006.01)
*G06F 18/21* (2023.01)
(Continued)

(52) U.S. Cl.
CPC ............ *H04N 7/188* (2013.01); *G06F 18/21* (2023.01); *G06F 18/24* (2023.01); *G06K 7/1095* (2013.01);
(Continued)

(58) Field of Classification Search
CPC .... H04N 7/188; G06K 9/6217; G06K 9/6267; G06Q 50/12
See application file for complete search history.

(56) References Cited

U.S. PATENT DOCUMENTS

| | | | | |
|---|---|---|---|---|
| 6,318,137 B1 * | 11/2001 | Chaum | ................. | E05B 49/002 340/5.67 |
| 8,844,811 B1 * | 9/2014 | Rogers | ............... | G07C 9/00904 235/382 |

(Continued)

FOREIGN PATENT DOCUMENTS

| | | | | |
|---|---|---|---|---|
| CN | 106570797 A | * | 4/2017 | |
| WO | WO-2018048352 A1 | * | 3/2018 | |
| WO | WO-2021174887 A1 | * | 9/2021 | ............. G06Q 50/06 |

OTHER PUBLICATIONS

Infraspeak Blog, "6 Ways Hotels Can Benefit From NFC Technology," blog.infraspeak.com/6-ways-hotels-can-benefit-nfc-technology (2018).

(Continued)

*Primary Examiner* — Rowina J Cattungal
(74) *Attorney, Agent, or Firm* — Brandon N. Sklar (57) ABSTRACT

A method for managing a hospitality workflow in a hotel, comprises imaging a region in front of a hotel room door on a checkout day, after the hotel room door is opened, by a camera. An image of the region is analyzed for the presence of a person and the image is analyzed for the presence of a bag, by a processing device. It is determined whether a guest checked out of the room based on the detection of the person and the detection of the bag. If it is determined that the guest checked out, the housekeeping department may be informed that the guest checked out, enabling quicker cleaning of a vacated room. A door lock system including the camera and a check-in procedure comprising reading QR code image on a guest's smart device by the camera, for example, are also disclosed.

32 Claims, 7 Drawing Sheets

(51) Int. Cl.

| | | |
|---|---|---|
| *G06F 18/24* | (2023.01) | |
| *G06K 7/10* | (2006.01) | |
| *G06K 7/14* | (2006.01) | |
| *G06N 3/08* | (2023.01) | |
| *G06Q 10/10* | (2023.01) | |
| *G06V 20/40* | (2022.01) | |
| *G06V 40/10* | (2022.01) | |
| *G07C 9/00* | (2020.01) | |
| *H04N 23/60* | (2023.01) | |
| *G06Q 10/02* | (2012.01) | |

(52) U.S. Cl.
CPC ............ *G06K 7/1417* (2013.01); *G06N 3/08* (2013.01); *G06Q 10/103* (2013.01); *G06V 20/41* (2022.01); *G06V 40/10* (2022.01); *G07C 9/00904* (2013.01); *H04N 23/60* (2023.01); *G06Q 10/02* (2013.01)

(56) References Cited

U.S. PATENT DOCUMENTS

| | | | | |
|---|---|---|---|---|
| 8,903,425 | B2 * | 12/2014 | Guenec | G07C 9/00571 |
| | | | | 705/13 |
| 9,130,934 | B2 * | 9/2015 | Warrick | H04L 63/10 |
| 10,548,006 | B2 | 1/2020 | de Freitas et al. | |
| 10,887,647 | B2 | 1/2021 | Wong et al. | |
| 11,004,284 | B2 * | 5/2021 | Zilka | G07C 9/257 |
| 2008/0228532 | A1 * | 9/2008 | Gengarella | G06Q 10/02 |
| | | | | 705/5 |
| 2012/0240195 | A1 * | 9/2012 | Weiss | H04L 63/0853 |
| | | | | 726/4 |
| 2013/0257590 | A1 * | 10/2013 | Kuenzi | G05B 1/01 |
| | | | | 340/5.65 |
| 2015/0199863 | A1 * | 7/2015 | Scoggins | G07C 9/28 |
| | | | | 340/5.25 |
| 2016/0100199 | A1 | 4/2016 | DuBose | |
| 2017/0093875 | A1 | 3/2017 | de Freitas et al. | |
| 2017/0115018 | A1 * | 4/2017 | Mintz | G05B 15/02 |
| 2018/0146374 | A1 * | 5/2018 | Golan | G06Q 20/127 |
| 2018/0276928 | A1 * | 9/2018 | Smeets | G06Q 10/02 |
| 2020/0117156 | A1 * | 4/2020 | Guan | G05B 19/418 |
| 2021/0034882 | A1 * | 2/2021 | Johnson | G07C 9/00309 |
| 2021/0158676 | A1 * | 5/2021 | Mukundala | G08B 13/19695 |
| 2021/0357686 | A1 * | 11/2021 | Bera | G06N 20/00 |
| 2022/0036678 | A1 * | 2/2022 | Parekh | G07C 9/25 |
| 2022/0114514 | A1 * | 4/2022 | Perkins | H04W 4/80 |
| 2022/0188726 | A1 * | 6/2022 | Bidner | G06Q 30/02 |

OTHER PUBLICATIONS

Milestone, Inc., "NFC: In The Hotel Industry," https://blog.milestoneinternet.com/web-design-promotion/nfc-in-the-hotel-industry/ (Mar. 13, 2019).
S. Ren, K. He, R. B. Girshick, X. Zhang, and J. Sun, "Object detection networks on convolutional feature maps," CoRR, abs/1504.06066 (2015).
C. Szegedy, et al., "Going deeper with convolutions," CoRR, abs/1409.4842 (2014).
M. Lin, Q. Chen, and S. Yan. Network in network. CoRR, abs/1312.4400 (2013).
D. Mishkin, "Models accuracy on imagenet 2012 val," https://github.com/BVLC/caffe/wiki/Models-accuracy-on-ImageNet-2012-val (2012).
O. Russakovsky, et al., ImageNet Large Scale Visual Recognition Challenge. International Journal of Computer Vision (IJCV) (2015).
Redmon, J., "Real-Time Grasp Detection Using Convolutional Neural Networks," https://pjreddie.com/media/files/papers/grasp_detection_1.pdf (2015).
M. Everingham, et al., "The pascal visual object classes challenge: A retrospective," International Journal of Computer Vision, 111(1):98-136, Jan. 2015.
J. Redmon, "Darknet: Open source neural networks in c," (2013-2016) http://pjreddie.com/darknet/.
"pjreddie/darknet," https://github.com/pjreddie/darknet (Accessed Mar. 11, 2020).
Chien-Yao Wang, et al., "Scaled-YOLOv4: Scaling Cross Stage Partial Network," (2011) https://arxiv.org/pdf/2011.08036.pdf.
Alexey Bochkovskiy, et al., "YOLOv4: Optimal Speed and Accuracy of Object Detection," (2004) https://arxiv.org/pdf/2004.10934.pdf.

* cited by examiner

METHODS AND SYSTEMS FOR AUTOMATING HOSPITALITY WORKFLOWS

FIELD OF THE INVENTION

Automated hospitality services and procedures, and, more particularly, automated hotel check-in, hotel check-out, scheduling and control of hotel housekeeping, and control of other operations.

BACKGROUND OF THE INVENTION

Some of the biggest challenges in hotel hospitality include building automation and building management to achieve sustainability. Currently, nearly 30% of guests leave their rooms without checking out at the front desk. While convenient for guests, a hotel may not detect that a guest has checked out for hours after the guest has left. This results in delays in providing room service to a vacated room. In addition, room-service personnel are not efficiently managed for providing room service of a checked out room because there is very low load at the beginning of the day and peak demand for room service later in the day, when new guests are checking in. Since it can take 40 minutes to 45 minutes to clean a room in high-end hotels and integrated resorts, and many checked out rooms are serviced later in the day, there may be delays in checking in new guests.

Saving energy is also an important priority in hotels due to the current interest in climate change and to save costs. Often, guests check out and leave the lights, TV, air conditioning, heat, and/or fans on in their rooms, for example. Since it might be many hours before housekeeping enters the room, as discussed above, there may be a significant waste of electricity. A coffee machine may also be left on, for example, which could also waste electricity and could be dangerous. Some hotels have the capability of reducing the power and/or current of the electricity provided to a hotel room after a guest has checked out.

SUMMARY OF THE INVENTION

In accordance with an embodiment of the invention, a method for managing a hospitality workflow in a hotel comprises imaging a region in front of a hotel room door on a checkout day, after the hotel room door is opened, by a camera. An image of the region is analyzed for the presence of a person and the image of the region is analyzed for the presence of a bag, by a processing device. It is determined whether a guest checked out of the room based on the detection of the person and the detection of the bag, by the processing device. The determination may be made by the processing device or another processing device. If it is determined that a guest checked out of a room, a message may be sent to the guest to confirm that the guest checked out. The housekeeping department may be informed that the guest has checked out, enabling quicker cleaning of a vacated room.

In accordance with another embodiment of the invention, a system for managing a hospitality workflow in a hotel is disclosed comprising a hotel management system including a first processing device, a camera positioned to image a region in front of a door of a hotel room, and a door lock system attached to the door. The door lock system comprises a second processing device coupled to the hotel management system via a network. The second processing device is configured to cause the camera to image a region in front of the door when the door is open on check out day, to analyze the image for the presence of a person and to analyze the image for the presence of a bag. The second processing is further configured to determine that the guest is checking out of the room based on the detection of the person and the detection of the bag. The camera may be part of the door lock system. The first processing device may be configured to inform a housekeeping department of the hotel that the guest checked out, when it is determined that the guest has checked out.

In accordance with another embodiment of the invention, a door lock system for a door of a hotel room is disclosed comprising a casing to be attached to a door and a motor coupled to a latch bolt. A camera is positioned to face outward from a door that the door lock system is to be attached to. A processing device is configured to control operation of the camera to record at least one image when a person leaves the hotel room on a checkout day and to analyze the at least one image for the presence of a person and the presence of a bag. The processing device is further configured to determine whether the guest checked out based on analysis of the at least one image. The door lock system may further include a slot in the casing configured to receive a room key, and the camera may be supported by a card or substrate configured to be received within the slot.

In accordance with another embodiment of the invention, a method for allowing a guest to enter a room is also disclosed comprising providing a QR code image to a smart device of a guest, and reading the QR code image displayed by the smart device by a camera positioned to image a region in front of a door of the room. Data in the QR code string is compared to stored data and a door lock system is unlocked if the data matches the stored data.

DETAILED DESCRIPTION OF THE FIGURES

In accordance with an example of an embodiment of the invention, to more rapidly inform a hotel that a guest has checked out, a door lock system is configured to determine that a user has checked out by analyzing one or more images taken by a camera of the guest leaving their room. The door lock system is further configured to inform a hotel management system ("HMS") of the check out. The HMS may then inform the housekeeping department. The hotel can then have the checked-out room cleaned sooner than if the hotel was not was not informed of the check out. The HMS may inform other departments, such as the billing department, for example, of the checkout. The HMS may also control operation of devices and fixtures in the room that are under the control of the HMS via a network, when the HMS is informed that the guest has checked out. For example, the HMS may control the temperature in the room by controlling operation of a thermostat in the room. The HMS may lower the thermostat when a guest checks out, for example. The HMS may also control the operation of an air conditioning system and/or a heating system to control the temperature in the room by lowering or shutting them off to save energy. Other device and fixtures in the room that may be controlled after the guest checked out to save energy include the lights, TV, fan(s), and/or coffee machine in the room, for example, which may also be lowered or shut off if they are under the control of the HMS via a network.

The HMS may send a message to the guest via the App, by email, or text, for example, requesting confirmation that the guest has checked out. In this example, the HMS will not take further action unless check out is confirmed. The camera may be positioned in other locations where a region in front of the hotel room door may be imaged, such as by a camera on a wall next to the door, on the ceiling, or on a wall across from the hotel room door, for example. As used herein, the phrase "on a wall" is also meant to include "in a wall," such as the camera being embedded in a wall, for example.

The door lock system may determine whether the guest has checked out by performing image analysis of one or more images of the guest leaving the room. In one example, on check out day, the door lock is configured to run the camera and record one or more images of the guest as they leave the room. The image or images are analyzed by the door lock system for the presence of a person and the presence of a bag, such as luggage, a suitcase, a garment bag, duffle bag, tote bag, a trunk, back pack, a brief case, or other such container for containing the belongings of a guest, for example. A guest leaving the room with a bag on check out day is considered to be an indication that the guest is checking out. The image may be analyzed by an object identification and classification algorithm, for example. The algorithm may be run by a convolutional neural network ("CNN") trained to recognize people and bags, for example. If the output of the CNN indicates the presence of a person and a bag, the HMS is informed by the door lock system that the guest is checking out of the room. Confidence thresholds for the detection of a guest and the detection of a bag, respectively, may be set. The HMS may then inform the housekeeping department that the room may be cleaned. Other departments may also be informed of the checkout, and/or devices/fixtures in the room may be controlled if the guest has checked out, as discussed above. In another example of this embodiment, the one or more images may be provided to the HMS for analysis. The analysis may also be performed in the cloud.

In accordance with another embodiment of the invention, an improved check-in process is disclosed that improves guest security. In one example, a guest checks into a hotel via an App of the hotel or hotel chain by entering the hotel and connecting their smart device, such as a smart phone, to the hotel Wi-Fi with the reservation number of the reservation, for example. In response, an HMS of the hotel informs the guest of the room number and generates a QR code image including identifying information of the guest, identifying information about the hotel, and the hotel and/or a unique one-time key, for example. The HMS sends the QR code image to the user's smart phone or other smart device. In one example, the HMS also sends the QR code image or data in the QR code image to the door lock of the guest's assigned room.

When the guest approaches the assigned room, the guest displays the QR code on the smart device to the door lock. The door lock may also include a proximity sensor to detect the presence of the guest in front of the door and a camera, such as a CMOS camera, to read the QR code image on the guest's smart device. The door lock system is configured to decode the QR code image using computer vision, for example, and to compare data in the decoded QR code image to the data provided by the HMS when the guest checked in. If the decoded QR code image matches the data received from the HMS, the door is unlocked, and the guest may enter the room. Since the QR code image includes multiple pieces of information, all of which much match, the door lock in this example performs a multi-factor authentication process that improves the guest's security. To further improve security, the HMS may generate a new QR code image and send it to the guest's smart device and the door lock of the guest's room each time the guest leaves the room, daily, periodically, when requested by the guest, and/or at other times. It is noted that the camera and/or the proximity sensor in this embodiment may also be provided in the wall adjacent to the door instead of in the door lock system. If the data in the QR code image does not match the received data, then the door stays locked. The guest may then request a new QR code image through the App without needing to go back to the front desk. Alternatively, the guest may go to the front desk for assistance. Instead of a camera, the door lock system can include other types of QR code readers or scanners to read the QR code image, such as an appropriate bar code reader, for example.

In another example of this embodiment, the door lock system sends the data in the QR code image to the HMS or to the cloud, which compares it to the data in the QR code image generated by the HMS. The data in the QR code image may be in the form of a QR code string, for example. If the data matches, the HMS instructs the door lock system to open the door. In this example, the HMS need not send the QR code string or data in the QR code string to the door lock system for performing the comparison.

Figure 1:
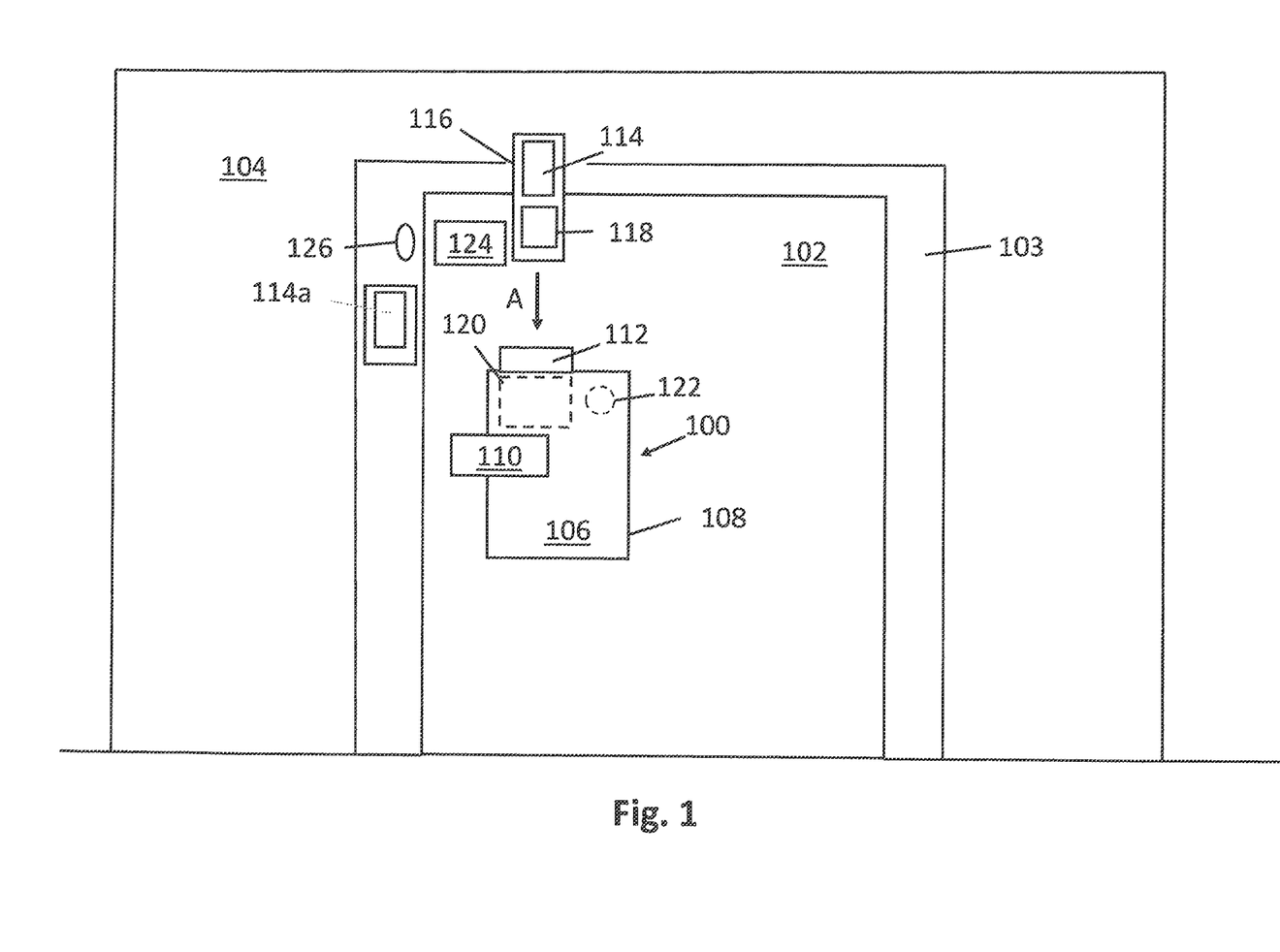
FIG. 1 is a schematic representation of an example of a door lock system on a door of a hotel room, in accordance with an embodiment of the invention.

FIG. 1 is a schematic representation of an example of a door lock system 100 on a door 102 of a hotel room 104, in accordance with an embodiment of the invention. The door 102 is within a door frame 103. The door lock system 100 may include a traditional hotel door lock 106 attached to the door 102. The traditional hotel door lock 106 includes a casing 108 containing a motor driver, a motor, and a latch controlled by the motor for locking and unlocking the door 102 (not shown in this view). A doorknob 110 and an upwardly facing slot 112 in the casing 108 for insertion of a traditional hotel entry card are also shown.

In accordance with this embodiment of the invention, a camera 114 is mounted on a portion of a card or substrate 116. The card or substrate 116 may be inserted into the slot 112, as indicated by the arrow A, to retrofit a conventional door lock system 100. The camera 114 may include an image sensor, such as a photoelectric sensor, for example. The photoelectric sensor may be a CMOS sensor, for example. Suitable off the shelf CMOS sensors are available from many companies, such as OmniVision Technologies, Inc., Santa Clara, California, On Semiconductor, Phoenix, Arizona, and AMS AG, Austria, for example. A CMOS sensor from OmniVision Technologies, Inc., Santa Clara, California having a resolution of 5, 8 or 13 megapixels may be used, for example.

Electronics 118 for processing an image, including image signal processing (ISP) and an interface input/output (not shown), are mounted on a second portion of the card or substrate 116. When inserted into the slot 112, the first portion of the card or substrate 116 including the camera 114 extends out of the slot so that the camera faces away from the door 114. The second portion of the card or substrate 116, including the electronics 118, lies within the slot 110, securing the camera 114 in a fixed position with respect to the slot 112 and the door 102. When within the slot 110, the electronics 118 is coupled to a printed circuit board 120 within the casing 108 including a processing device, as discussed further below. Instead of the camera 114, the door lock system 100 may include or be modified to include other bar code readers known in the art.

A proximity sensor 122 may also be provided within the casing 108, for detecting the presence of a person in front of the door. The proximity sensor 118 may be part of or coupled to the printed circuit board 120, as discussed with respect to FIG. 2. The proximity sensor 118 may be an ultrasonic sensor configured to emit sound and detect the emitted sound reflected from a person in front of the door of the hotel room. The ultrasonic sensor may include an emitter and a receiver, configured to emit sound and to detect sound reflected from a person within about 50 cm from the sensor, for example. An opening (not shown) may be provided through the casing 108, in front of the proximity sensor 118, to enable the proximity sensor to emit sound to the outside of the casing and to detect reflected sound. An off the shelf ultrasonic sensor, such as an HC-SR04, may be used, for example. An HC-SR04 ultrasonic sensor may be obtained from Parallax, Inc., Rockland, California, for example.

A door sensor 124 may be provided in the door 102 to detect when the door is opened. The door sensor 124 may also be connected to the printed circuit board 120. The door sensor 124 may be a Hall Effect sensor, for example. In this example, a magnet 126 is positioned in the door frame 103 of the door 102 so that the magnet is proximate the Hall Effect sensor 124 when the door is closed, as shown in FIG. 1. The presence of the magnet creates a voltage difference across a conductor in the Hall Effect sensor 124. When the door 102 is opened, the magnet is no longer proximate the Hall Effect sensor 124 and the voltage difference disappears. From the presence or absence of the voltage difference, a processing device on the printed circuit board 120 can determine whether the door 102 is opened or closed. Other types of door sensors 124 may be used to determine whether the door is opened or closed, such as a contact sensor, for example.

In another example, a camera 114a supported on a card or substrate 118a may be provided on or in a portion of the wall or the door frame 103 of the guest room adjacent to the door 102 instead of protruding from the door lock system 100, as in FIG. 1. Similarly, a proximity sensor 122a may be provided on or in the door frame 103 or in a portion of the wall of the guest room adjacent to the door instead of in the door lock system 100, as is also shown in FIG. 1.

Other components of a traditional door lock, such as an LED or other light source may be provided to indicate that an inserted key is accepted or not, for example, are not shown to simplify the Figure.

Figure 2:
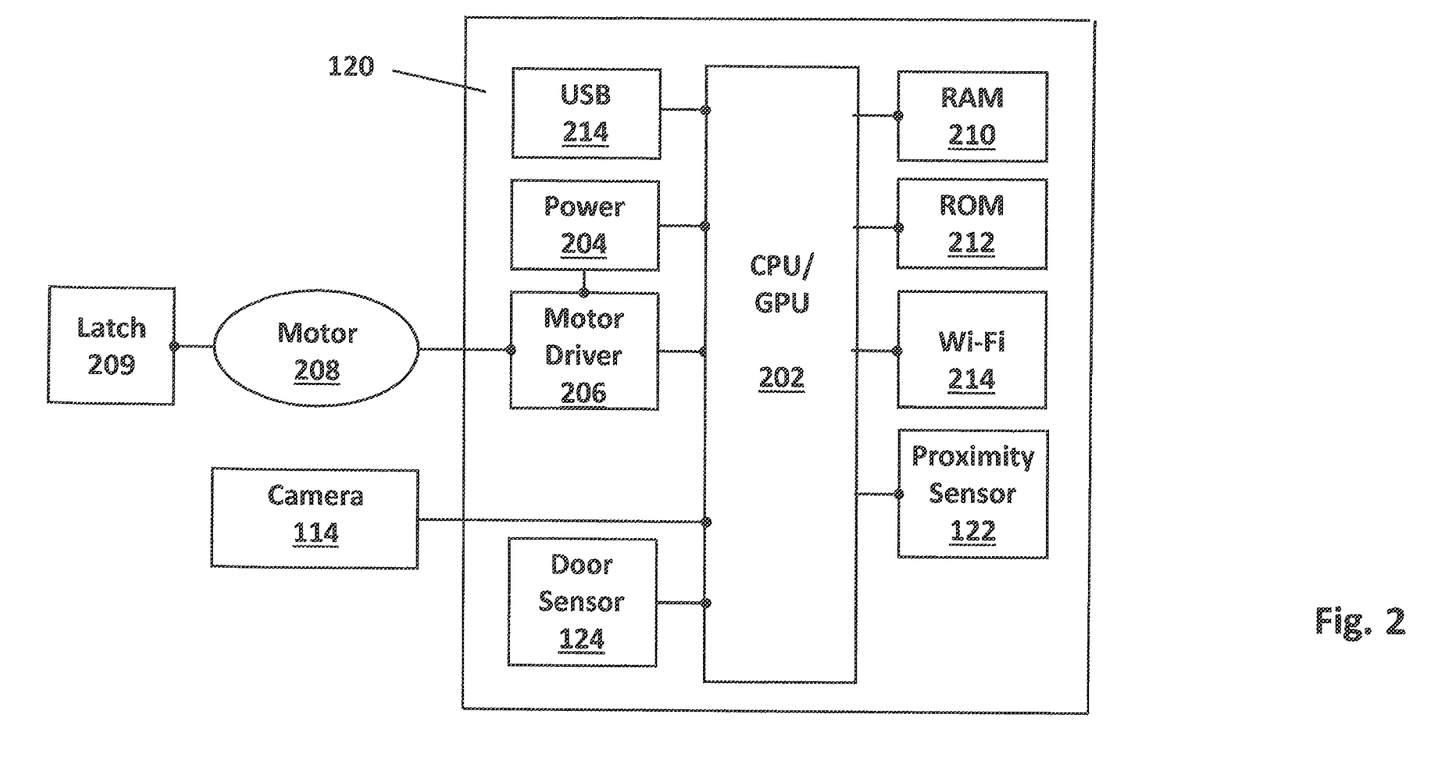
FIG. 2 is a schematic representation of a printed circuit board that may be provided in a casing of the door lock system of FIG. 1.

FIG. 2 is a schematic representation of a printed circuit board 120 that may be provided in the casing 108 of FIG. 1. Elements common to FIG. 1 are commonly numbered. The printed circuit board 200 includes one or more processing devices 202. In this example, the processing device 202 is a combination central processing unit ("CPU")/graphical processing unit ("GPU") for image processing of images provided by the camera 114. FIG. 2 shows the camera 114 connected to the CPU/GPU 202 when the camera 114 is inserted into the slot 114 of FIG. 1. The proximity sensor 122 and the door sensor 124 of FIG. 1 are also shown connected to the CPU/GPU 202. The CPU/GPU 202 may run a minimalistic, real time operating system for accelerated image processing. The CPU/GPU 202 may be a single-board computer, such as Jetson Nano or Jetson Xavier NX available from Nvidia Corporation, Santa Clara, California, for example, which run on low power. A Raspberry Pi Zero W, which has wireless capability, may also be used. The Raspberry Zero W is available from The Raspberry Pi Foundation, Cambridge, UK. The CPU/GPU 202 may also be provided on the card or substrate 116 of FIG. 1. The functions of the electronics 118 on the card/substrate 116 may be performed by the CPU/GPU 202.

A power supply 204 is shown coupled to the CPU/GPU 202 and to a motor driver 206, which is also coupled to the CPU/GPU 202. The motor driver 206 is coupled to and controls the operation of the motor 208, which is connected to a latch 209 that locks and unlocks the door. The power supply may be a 5 volt, 2 ampere battery, for example.

Random access memory ("RAM") 210 and read only memory ("ROM") 212 are also coupled to the CPU/GPU 202. A Wi-Fi module 214 is coupled to the CPU/GPU 202 to enable communication between the CPU/GPU and the HMS (not shown) and a smart device of the guest. The Wi-Fi module 214 may be embedded in the CPU/GPU 202, such as the Raspberry Pi Zero W, or may be an off the shelf Wi-Fi module 214 available from Intel Corporation, Santa Clara, California, Qualcomm, San Diego, California, or Cypress, San Jose, California, for example. A USB port 216 is provided for debugging and tracing of the logs of the door lock 100 for each event, if needed. If a camera 114a and/or a proximity sensor 122a is located in or on the wall next to the door instead of the door lock system 100, then these components may be configured to communicate with the CPU/GPU 202 wirelessly. The CPU/GPU 202 may communicate with these components via the wireless module 214, for example.

As discussed above, in the example of FIG. 1, a traditional hotel door lock 106 already attached to the hotel door 102 is retrofit by inserting the card or substrate 116 supporting the camera 114 into the slot 112 and adding the printed circuit board 120 in the casing 108. In other examples, the hotel door lock system 100 may be manufactured to include the camera 114 and electronics 118 on the printed circuit board 120 within the casing 108. An opening (not shown) may be provided in the casing 108 for the camera 114 to see outside the case.

Figure 3:
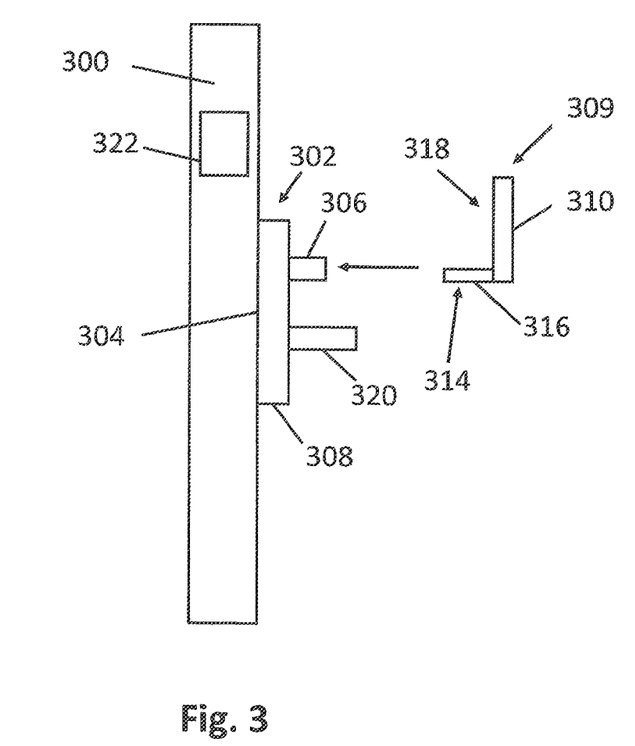
FIG. 3 is a side view of another door lock system attached to a door, in accordance with an embodiment of the invention.

FIG. 3 is a side view of a door 300 with another door lock system 302, in accordance with another embodiment of the invention. The door lock system 302 includes a traditional door lock 304 having a slot 306 for receiving a key card in the front face of the door lock casing 308 in a horizontal direction. In this case, the card or substrate 309 supporting the camera 310 is folded so that a first portion 314, including the electronics 316, can be inserted horizontally into the slot 306, and a second portion 318 supporting the camera 310 is perpendicular to the first portion so that it is parallel to the door 300, facing a guest when the guest approaches the door. A doorknob 320 is also shown. A printed circuit board 120 as in FIG. 2 may be added to the traditional door lock 304, as discussed above with respect to FIG. 1. A Hall Effect or other such sensor 322 may be embedded in the side of the door 300 to sense whether the door is open or close, as discussed above with respect to FIG. 1. As in the example of FIG. 1, instead of the camera 310, the door lock system 302 may include or be modified to include other bar code readers known in the art.

Figure 4:
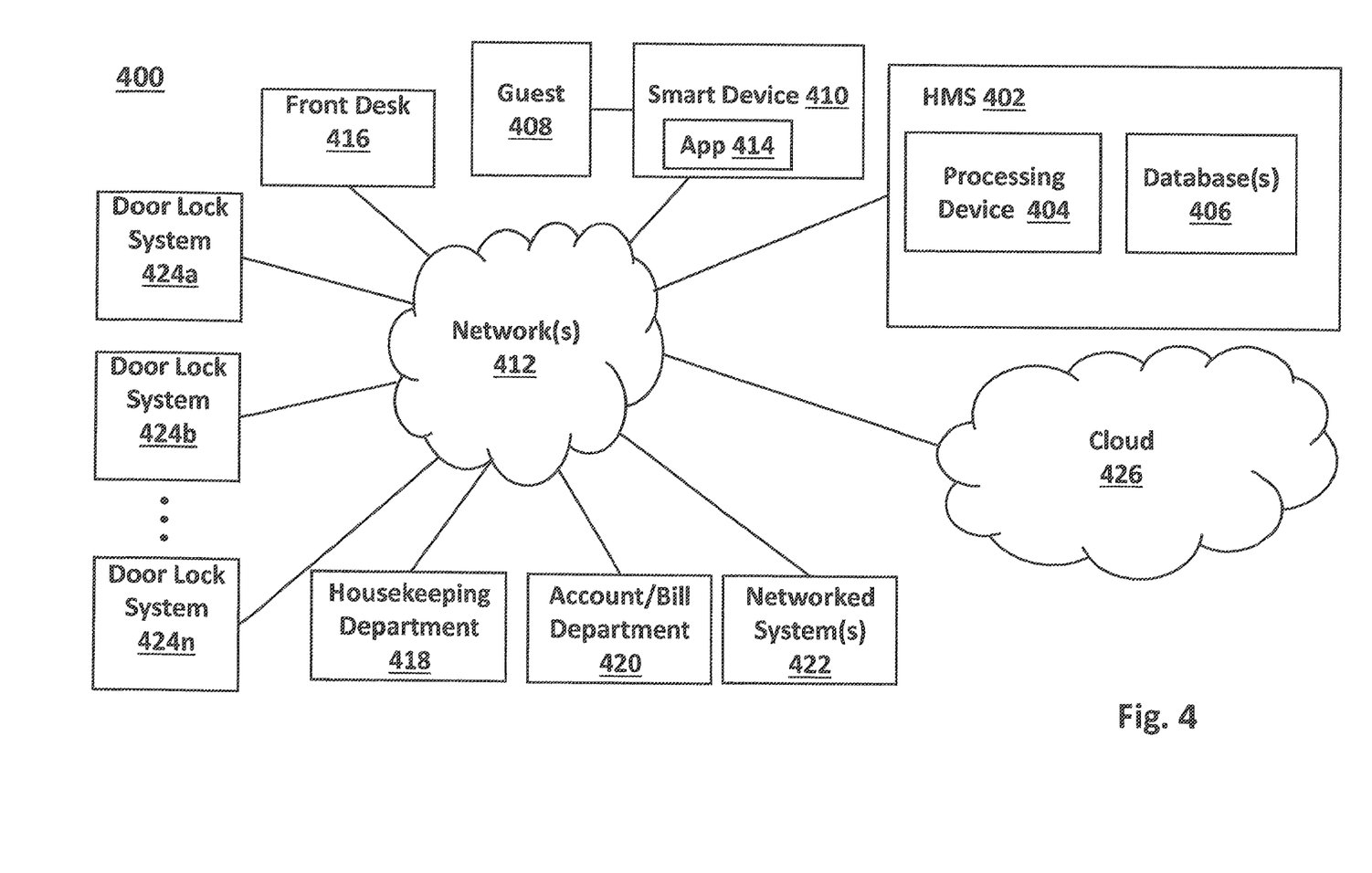
FIG. 4 is a block diagram of an example of a hotel system 400 including a hotel management system (HMS)

FIG. 4 is a block diagram of an example of a hotel system 400 including an HMS 402. The HMS 402 includes a processing device 404, such as a CPU, for example, and one or more databases 406. The HMS may be on the hotel premises or at a remote location. A guest 408 communicates with the HMS 402 using a smart device 412, such as a smartphone, via a network 412. The network 412 represents one or networks through which components of the system 400 may communicate with each other, such as a Wi-Fi network, a cellular network, the Internet, an Intranet, an ethernet, or a land area network, for example. The guest 408 may have downloaded an App 414 provided from the hotel ("hotel App" or "App") on their smart device 408 prior to entering the hotel or when entering the hotel, to communicate with the HMS 402, in order to check-in and to receive information from the hotel, for example.

The one or more databases 406 store information used by the HMS 402 to manage the hotel, including guest information. Guest information may include the guest's name, guest address, guest phone number, the guest reservation number, the checkout date, the assigned hotel room, the generated QR code string, etc.

The processing device 404 of the HMS 402 may communicate with computers at important locations in the hotel, such as the front desk 416, the housekeeping department 418, and the accounting/billing department 420, for example, via the network 412. The HMS 402 may also communicate with smart devices (not shown) of important personnel, via the network 412. In addition, the HMS 402 may communicate with and control other networked hotel system(s), such as the power and/or current provided to the hotel room or to particular devices and fixtures in the hotel room, such as lights, TV, room thermostat, air conditioning, a heating system, a coffee machine, and/or fans in respective hotel rooms, for example. The HMS 402 also communicates with respective door lock systems 424a, 424b, . . . 424n on respective hotel room doors in the hotel via the network 412. Some or all of the functionality of the HMS 402 may also be in the cloud 426.

Figure 5:
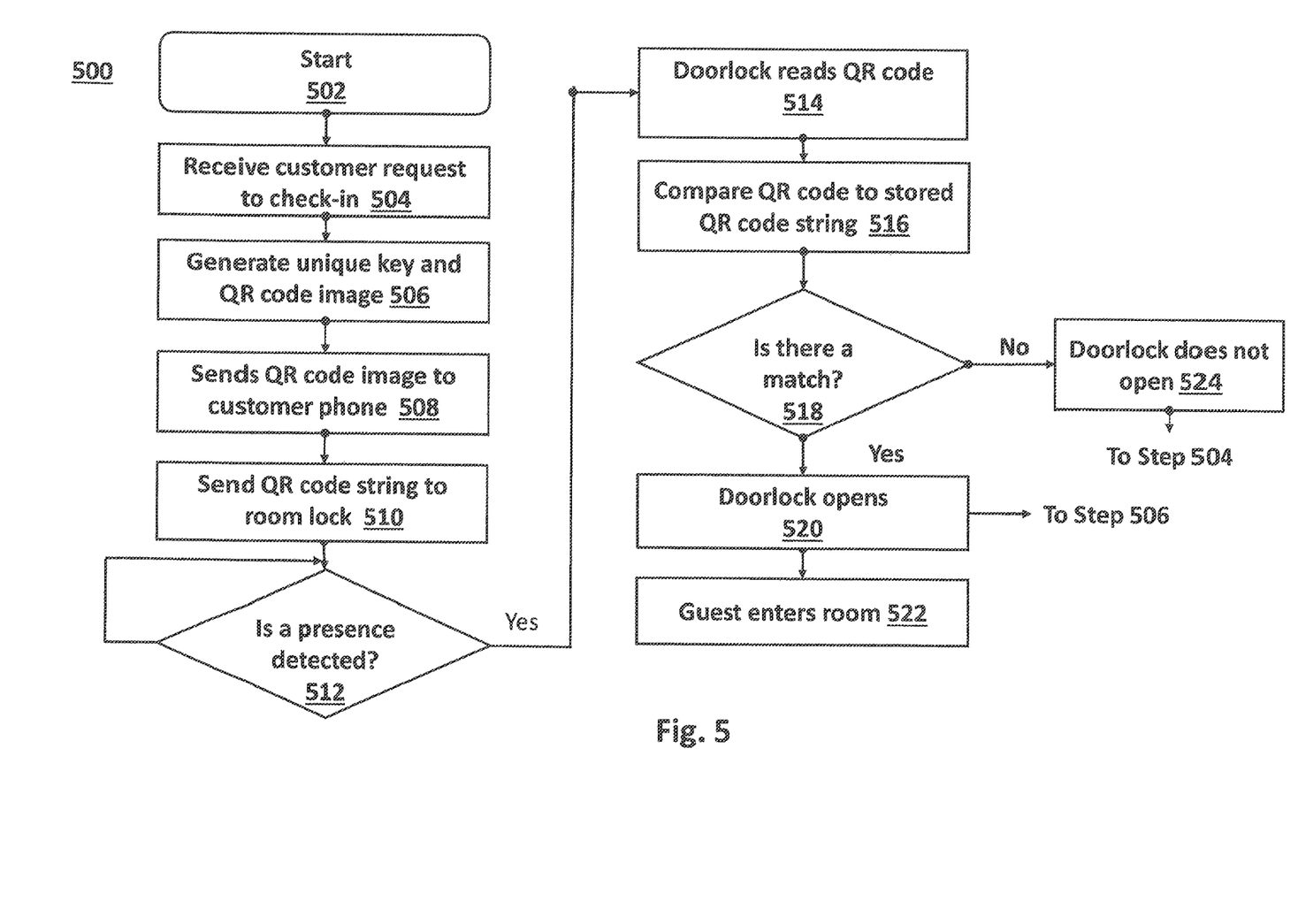
FIG. 5 is a flowchart of an example of a method of guest check-in, in accordance with an embodiment of the invention.

FIG. 5 is a flowchart 500 of an example of a method of guest check-in, in accordance with an embodiment of the invention. The method starts in Step 502, when a guest 408 checks into the hotel. The guest 408 may check-in by entering the hotel lobby and accessing the hotel Wi-Fi or other such network 412 via the App 414 on the guest's smart device 410, such as the guest's smartphone. In a case where the guest has not checked-in yet and has not been assigned a room, the guest may connect to the hotel Wi-Fi by entering their reservation number in a webpage displayed by the App 414 on the smart device 410, for example. If the guest 406 already knows their assigned room, the room number may be entered in the webpage. After connecting to the hotel Wi-Fi, for example, the guest 408 sends a request to check in to the HMS 402 via the App 412, which is received by the HMS 402, in Step 504.

During check-in, the HMS 402 collects and/or confirms information about the guest 408, such as the guest's name, address, check out date, and payment completion information (whether the guest has paid or provided payment information), for example. It is noted that in this example, the HMS 402 does not store credit card information or other payment information. Such information may be stored in a separate, secure payment platform (not shown), as is known in the art. The HMS 402 may assign a hotel room and associate the hotel room number with the guest information in the database(s) 406. The collected information may be arranged by the processing device 404 of the HMS 402 in a string, such as a JavaScript Object Notation ("JSON") string, for example. An example of a string is: {"Guest": "Wael Guibene", "RNbr": 237, "Hotel": "Acme Hotels" }, which includes the guest name, room number, and hotel, for example.

The processing device 404 of the HMS 402 generates a unique, one-time key for use in a QR code string, in Step 506. The QR code string may be generated under the control of a QR code generator, such as Open CV, for example. The one-time key may be appended to the JSON string including the guest information, or other such string, for example. An example of a unique key may be 1H8J35UB9q and an example of a JSON string including the appended key is: {"Guest": "Wael Guibene", "RNbr": 237, "Hotel": "Acme Hotels", "SKey": "1H8J35UB9q"}. The JSON string and the unique key may have other formats. The QR code string is generated from the JSON string in this example, also in Step 506. A QR code image is generated from the QR code string. The QR code image may be generated in a manner known in the art, such as by Open CV, for example.

The QR code image is sent by the HMS 402 to the App 414 on the guest's smart device 414, in Step 508, via the network 412. The App 414 may store the QR code image in Photos on the guest's smart device 408, for example. The HMS 402 may send the QR code image via a Wi-Fi, short message service ("SMS"), or multimedia messaging service ("MMS") via the network or networks 412, for example.

The data in the QR code image is sent by the HMS 402 to the door lock system 100 of FIG. 1 or the door lock system 302 in FIG. 3, in Step 510, via the network 412. The data may be in the form of the QR code string, discussed above, or another format. The QR code string includes the information to be used by the door lock system 100, 302 to verify the QR code image displayed by the guest 408. Since in this example multiple pieces of information about the guest 408 are provided in the QR code string and in the QR code image, such as the guest name, guest room number, and the unique key, along with a key, multifactor authentication of the guest 408 is provided. The QR code string may be stored in the RAM 210 of the printed circuit board 120, for example. The HMS 402 may send the QR code string to the door lock system 100, 302 via SMS or MMS, or another network 412, for example. The HMS 402 may send the QR code string to the door lock via the same or a different network 412 than the network used to send the QR code image to the smart device 408.

The door lock system 100, 302 waits to detect the presence of a guest 408 in front of the door 102, 300, in Step 512. The presence of the guest 408 in front of the door lock system 100, 302 may be detected by the proximity sensor 122. When a presence is detected, the CPU/GPU 202 may turn on the camera 114, 310 to read the QR code image presented by a guest via their smart device. After the QR code image is read, in Step 514, the camera sends the read information to the CPU/GPU 202. In this example, after the QR code is read, the camera 114, 310 may be turned off.

If a proximity sensor 122 is not provided, then the camera 114, 310 may be left on all the time and the presence of a guest 408 in front of the camera may be detected by image processing. A presence detection program employing computer vision may be used, for example. In one example, each frame of the video stream recorded by the camera is compared to a background image recorded by the camera when no one is in front of the door 102, 300. Foreground extraction and/or background subtraction may be performed on each frame of the video stream to determine if there is a presence in front of the door 102, 300, in a manner known in the art. For proximity detection, the camera 114, 310 may be set at a frame speed of 5 frames per second, for example. When a presence is detected by the camera 114, 310, the camera is readied to read the QR code image presented by the guest by increasing the frame speed of the camera to from about 25 frames per second to about 30 frames per second, for example. Other frame speeds may be used. If the camera 114, 310 does not read a QR code image within a predetermined period of time of detection of a presence, such as from about 30 to about 60 seconds, for example, the frame speed of the camera speed may be reduced to the speed for proximity detection method may return to Step 512.

The QR code image is read by the camera 114, 310 of the door lock system 100, 302, for example, in Step 514. As the QR code image is read, the camera sends the read information to the CPU/GPU 202. If there is no proximity sensor 122, the camera 114, 310 is kept on after reading the QR code. If there is a proximity sensor 122, the camera 114, 310 may be turned off.

The CPU/GPU 202 may decode a QR code image read by the camera 114, 310 by running a computer vision program, such as Open CV, for example, in a manner known in the art. Open CV or other such computer vision program may be stored in the ROM 212 or other such storage, for example.

The data in the read QR code image is compared by the CPU/GPU 202, for example, to the data in the QR code string or data in another format sent by the HMS 402 in Step 516, to determine whether they match, in Step 518. If there is a match (Yes in Step 518), the CPU/GPU 202 causes the door lock to open, in Step 520, and the guest 408 may enter the room 104, in Step 522. The CPU/GPU 202 may cause the door lock system 100, 302 to open by turning on the motor driver 206, which causes the motor 208 to open the door lock system, for example.

To improve security, the method 500 may then return to Step 506, where the HMS 402 generates a new unique key, appends it to the previously generated JSON string, and generates a new one-time use QR code string and QR code image, in Step 506. The method 500 proceeds as described above so that the next time the guest 408 enters the room, the door lock system again verifies the identity of the guest before the guest can enter the room. The QR code string and QR code image may be changed at other times, as well, as discussed herein.

Returning to Step 518, if the information in the read QR code image does not match the QR code string or other data provided by the HMS 402 (No in Step 518), then the door lock system 100, 302 is not opened, in Step 524. The guest may then check-in again, in Step 504 to repeat the process 500 again, or go to the front desk of the hotel, for example.

Instead of locally verifying the QR code image on the guest's smart device 410 by the door lock system 100, 302, the door lock system may send the data in the read QR code to the HMS 402 or to the cloud 426 for verification, via the network 412. The HMS 402 or processing in the cloud 426 would then compare the received data to the information in the JSON string or the QR code string generated by the HMS 402 or to the information stored in the database(s) 406, as in Steps 516 and 518. If there is a match, then the HMS 402 would send a message to the CPU/GPU 202 of the door lock system 100, 302 to cause the door lock system to open, as in Step 520, via the network 412.

Figure 6:
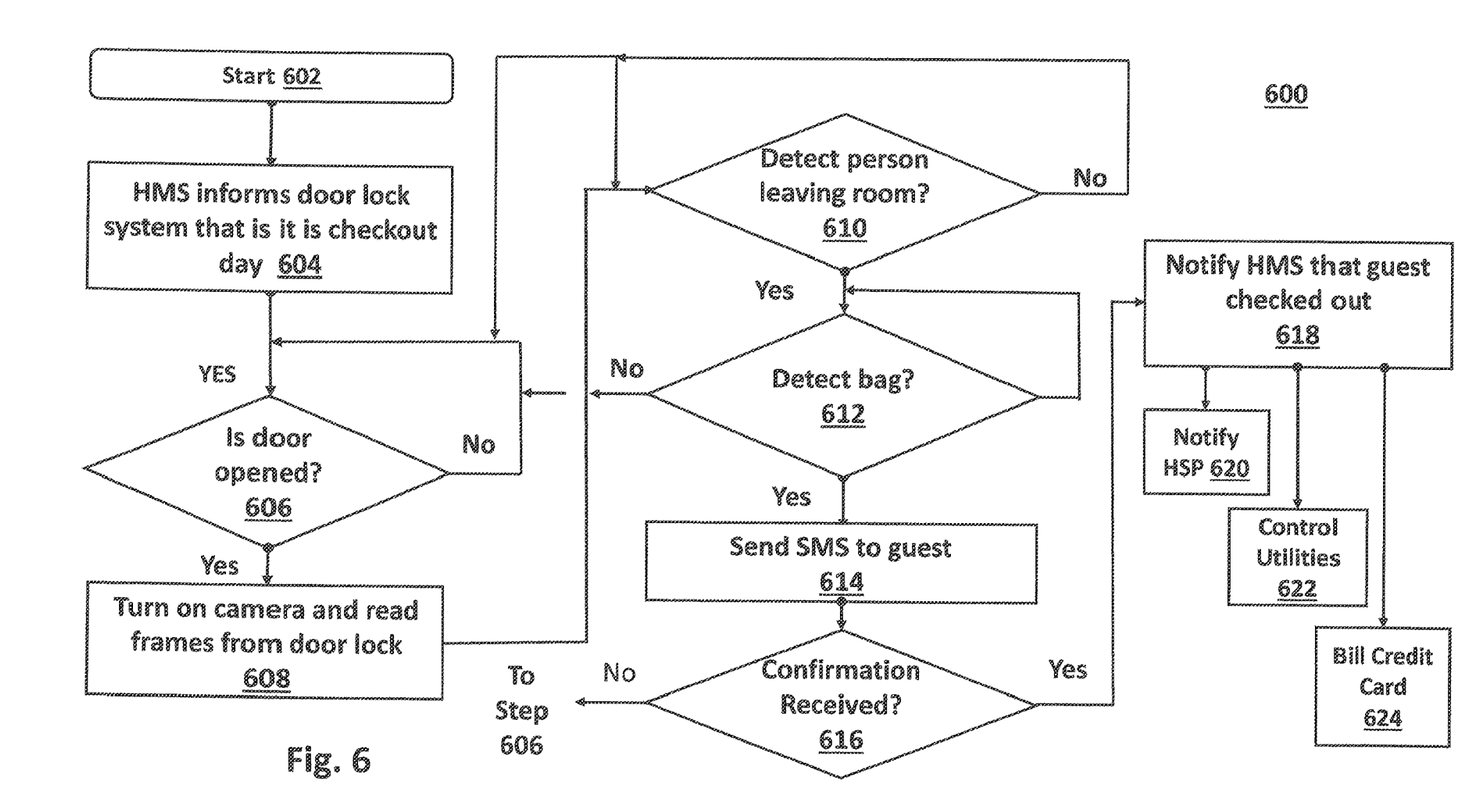
FIG. 6 is an example of a process for the automatic detection of the checkout of the guest, in accordance with an embodiment of the invention.

FIG. 6 is an example of a process 600 for the automatic detection of the checkout of the guest, in accordance with an embodiment of the invention. The process 600 starts in Step 602, on the scheduled checkout day of the guest. The HMS 402 informs the door lock system 100, 302 that it is checkout day, in Step 604. The door lock system 100, 302 waits until the door 102, 300 is opened, in Step 606. The opening of the door 100, 302 may be detected by the door lock system 100, 302 in a manner known in the art. For example, a Hall Effect sensor or a contact sensor may be provided, as discussed above. When the door is opened on checkout day (Yes in Step 606), the camera 114, 310 is turned on and frames are read, in Step 608. The camera 114, 302 may be turned on for from about thirty (30) seconds to about 1 minute, for example, to generate a video stream. It is noted that if it is not checkout day, the camera is not turned on when a guest leaves the room.

It is then determined whether a person is detected leaving the room, in Step 610, and whether a bag is detected leaving the room, in Step 612. Step 610 and Step 612 may be performed in any order. The detection of both a person leaving the room and a bag leaving the room is referred to as a checkout sequence and is used to determined that a guest is checked out. The CPU/GPU 202 of the door lock system 100, 302 may determine whether a person and a bag are leaving the room by performing an edge compute function by an object identification and classification algorithm run on one or multiple images recorded by the camera 114, 310, for example, to detect a person and a bag in front of the door of the room after the door is opened. It is noted that it is not necessary to identify a specific person or a specific bag. Only a generic person and a generic bag need be identified. The person and the bag may be detected or detected at the desired confidence level in the same or in different frames of the video stream. Confidence levels are described below. It is noted that instead of performing the object identification algorithm by the CPU/GPU 202 of the door lock system 100, 302, the door lock system could send the images to the HMS 402, via the network 412, and the algorithm could be run by the processing device 412 of the HMS. The object identification algorithm may also be run in the cloud 426.

If a door is opened in Step 606 but a person is not detected leaving the room (No in Step 610), Step 610 may be repeated or the process 600 may return to Step 606 to wait for the door 102, 300 to be opened again. In one example, Step 610 is first repeated and if a person is not detected in Step 610 after reading the image(s) a second time, then the process returns to Step 606 to wait for the door to be opened again. In another example, the CPU/GPU 202 may continue to read the frames recorded by the camera for a period of time and if a person is not detected, then the method 600 returns to Step 606. The period of time may be 25 to 30 seconds, for example.

If a person is detected leaving the room in Step 610 but a bag is not detected in Step 612 (No in Step 612), the image(s) may be analyzed again, in Step 612, or the process 600 may return to Step 606 to wait for the next time the guest 408 opens the door 102, 300. In another example, the CPU/GPU 202 may continue to read the frames recorded by the camera for a period of time and if a bag is not detected, then the method 600 returns to Step 606. The period of time may be 25 to 30 seconds, for example.

If both a person and a bag are detected leaving the room (Yes in Steps 610 and 612, respectively), in this example, a message is sent to the guest 408 to confirm that the guest is checking out, in Step 614. The message may be an SMS message sent by the door lock system 100, 302 via the network 412, for example. If a guest 408 leaves their room to go to breakfast, the gym or a business meeting before checking out, for example, the guest may be carrying a briefcase or gym bag, which could return in a positive determination in Step 612. By requesting a confirmation, the process 600 will not mistakenly determine that a guest is checking out prematurely. Alternatively, SMS or other such message may be sent to the guest by the HMS, via the network 412. Sending a message in Step 614 is optional.

If a confirmation of the message is received by the door lock system 100, 302 (Yes in Step 616), then CPU/GPU 202 of the door lock system 100, 302 informs the HMS 402 that the guest 408 has checked out, in Step 618. The CPU/GPU 202 may inform the HMS 402 via the network 412, for example. If a confirmation message is not received in Step 616, the method 600 returns to Step 606.

When the HMS 402 is informed that the guest 408 has checked out, the HMS may inform the housekeeping department 418 that the room may be cleaned, in Step 620. The HMS 402 may inform the housekeeping department 418 via the network 412 by sending an SMS message or other type of message to a computer or person in the housekeeping department, for example. Alternatively, the HMS 402 may update a table stored in the database(s) 406 or another location to indicate that a guest 408 has checked out and a room may be cleaned. In either example, the room may be cleaned and be ready for the next guest 408 sooner than if this embodiment of the invention was not implemented.

The HMS 402 may also control networked systems 422 in the hotel, such as electricity provided to a hotel room or to particular devices or fixtures connected to electricity in the hotel room, for example. Such devices and fixtures may include room thermostat, air conditioning, TV, a heating system, fans, lights, and/or a coffee machine, for example. When it is learned that the guest has checked out, in Step 622, if any or all of those devices/fixture are connected and can be controlled via the network 412, they may be turned off, or electrical power or current to the room may be decreased. The hotel may therefore save energy costs.

The HMS 402 may also instruct the accounting/billing department 420 to charge the user's credit card or may cause the user's credit card to be charged itself by submitting the guest's bill for processing, in Step 624. The hotel may therefore be paid sooner than if this embodiment of the invention was not implemented.

Figure 7:
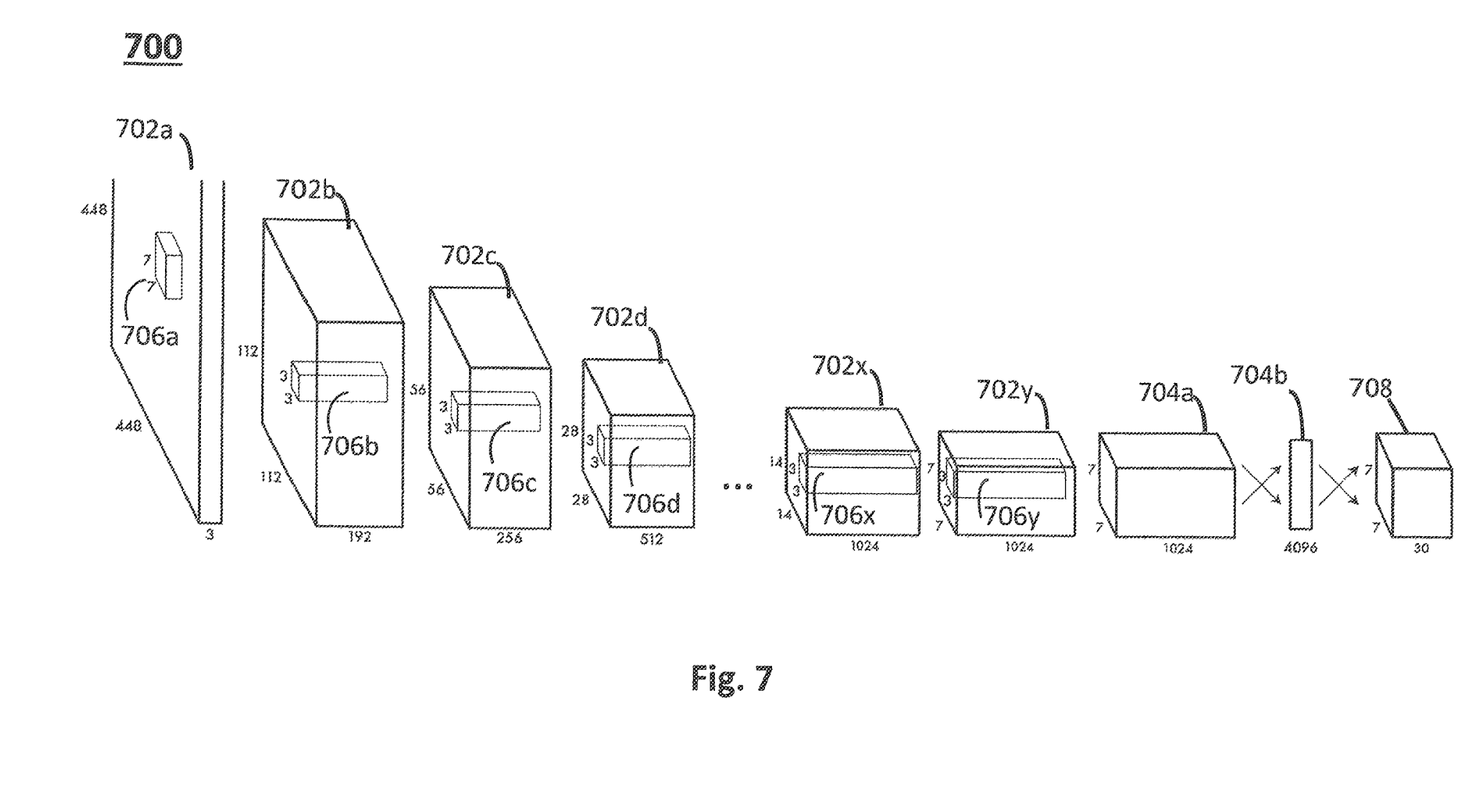
FIG. 7 is a schematic representation of an example of a convolutional neural network ("CNN") that may be used to implement an object identification and classification algorithm to identify a guest leaving the room with a bag.

As discussed above, in one example, an object identification and classification algorithm is run by the CPU/GPU 202 to infer the presence of a person and a bag in the image or video stream output by the camera 114, 310. The object identification and classification algorithm may also be run by the HMS 402 or may be performed in the cloud 426 or a combination of the CPU/GPU 202, HMS 402, and/or the cloud 426, for example. FIG. 7 is a schematic representation of an example of a convolutional neural network ("CNN") 700 that may be implemented by the CPU/GPU 202, the HMS 402 and/or the cloud 426 to run the object identification and classification algorithm, in accordance with an embodiment of the invention. The CNN 700 may be a Darknet framework, for example, as described in J. Redmon, "Darknet: Open source neural networks in c." http://pjreddie.com/darknet/.

In accordance with one example, the presence of a person may be inferred in Step 610 of FIG. 6 and the presence of a bag may be inferred in Step 612 of FIG. 6 with a desired degree of precision or confidence. For example, the presence of a person may be inferred with a precision or confidence of at least 90%, while the presence of a bag may be inferred with a precision or confidence of at least 50%. In other words, the inference of the presence of a person will be correct at least 90% of the time while the presence of a bag will be correct at least 50% of the time. Other examples of confidence ranges and levels are discussed below.

In the example of FIG. 7, the CNN 700 includes 24 convolution layers 702a, 702b, 702c, 702d . . . 702x, 702y, six (6) of which are shown. In addition, the CNN includes two (2) fully connected layers 704a, 704b, and an output 706. There may be more or fewer convolutional layers and fully connected layers. The CNN 700 architecture, in this example, is similar to the GoogLeNet model for image classification, with fewer convolutional layers. The GoogLeNet model is described in C. Szegedy, W. Liu, Y. Jia, P. Sermanet, S. Reed, D. Anguelov, D. Erhan, V. Vanhoucke, and A. Rabinovich, "Going deeper with convolutions," CoRR, abs/1409.4842, 2014, for example. The use of convolution layers and connecting layers, as in the CNN 700 of FIG. 7, is also described in (S. Ren, K. He, R. B. Girshick, X. Zhang, and J. Sun, "Object detection networks on convolutional feature maps," CoRR, abs/1504.06066, 2015. Instead of the inception modules described in GoogLeNet, 1×1 reduction layers and 3×3 convolutional layers may be used, as described in M. Lin, Q. Chen, and S. Yan, "Network in network," CoRR, abs/1312.4400, 2013. In this example, the input resolution of the first convolution layer 402a is increased from 224×224 pixels, as in GoogleNet, to 448× 448 pixels, to provide more fine-grained visual information. The two fully connected layers 704a, 704b include randomly initialized weights.

As is known in the art, each image of the video stream is sub-divided into smaller regions of interest by the CNN 700. Each convolution layer 702a, 702b, 702c, 702d . . . 702x, 702y defines a region of interest or boundary box. A boundary cell 706a, 706b, 706c, 706d . . . 706x, 706y is shown within each boundary box. A plurality of boundary cells is provided within each boundary box, which are not shown to simplify the illustration.

Each region of interest ("ROI") or boundary box and each boundary cell contain spatial dimensions (height and length) and a luminosity corresponding to the width of the boundary box. A box confidence score, which indicates how likely the box contains an object (objectness) and how accurate the boundary box is, is also associated with each boundary box and boundary cell. The convolution layers 702a, 702b, 702c, 702d . . . 702x, 702y extract features from progressively smaller spatial sub-regions of the image(s) of the video stream from convolution layer 702a to convolution layer 702y, with increasing luminosity (depth) from convolution layer 702a to convolution layer 702x.

In one example, the spatial dimensions of the boundary cell defined by the first, input convolution layer 702a in the example of the CNN network 700 is 7×7 pixels and the spatial dimensions of the first boundary box 706a is 448× 448 pixels. The spatial dimensions of the boundary cell defined by the second convolution layer 702b is reduced to 3×3, while the spatial dimensions of the second boundary box 706b is reduced to 112×112 pixels. The spatial dimensions of the boundary cells 706c, 706d, 706x, and 706y in the subsequent convolution layers remains 3×3. The spatial dimensions of the boundary boxes defined by the subsequent convolutions layers shown in FIG. 7 decrease to 56×56 in the third convolution layer 702c, to 28×28 in the fourth convolution layer 702d, and further to 14×14 in the convolution layer 702x, and 7×7 in the last convolution layer 702y. The depth (luminosity) of boundary box and boundary cell of the first convolution layer 402a is 3, which increases to 192 in the second convolution layer, to 256 in the third convolution layer, to 512 in the fourth convolution layer 702d, to 1024 in the second to last convolution layer 702x, and to 1024 in the last convolution layer 702y. Other CNNs having convolution layers having other spatial dimensions and luminosities in the convolution layers may be used.

The fully connected layers 704a, 704b fuse the information in the sub-regions analyzed by the convolution layers 702a, 702b, 702c, 702d . . . 702x, 702y and predict the output probabilities and coordinates of objects in the images by performing a linear regression to form a tensor, such as a 7, 7, 30 tensor, for example, as indicated in the output layer 708.

The spatial dimensions of the boundary boxes and boundary cells 706a, 706b, 706c, 706d . . . 706x, 706y defined by the convolution layers 702a, 702b, 702c, 702d . . . 702x, 702y are normalized by the spatial dimensions of the image. The spatial dimensions of the boundary boxes and the boundary cells 706a, 706b, 706c, 706d . . . 706x, 706y are parametrized to be offsets of a particular grid cell location. The offsets are between 0 and 1.

To avoid overfitting, dropout and data augmentation may be used, as is known in the art. A dropout layer with rate=0.5 after the first connected layer 704a has been found to prevent co-adaptation between layers, as described in G. E. Hinton, N. Srivastava, A. Krizhevsky, I. Sutskever, and R. R. Salakhutdinov, "Improving neural networks by preventing co-adaptation of feature detectors," arXiv preprint arXiv: 1207.0580, 2012. For data augmentation, random scaling and translations of up to 20% of the original image size may be introduced. The exposure and saturation of the image may also be randomly adjusted by up to a factor of 1.5 in the HSV color space.

The output of the CNN 700 is a probability of detection of a person and a probability of detection of a bag, based on the video stream. The CPU/GPU 202 (or the HMS 402 or processing in the cloud 426) may compare the probabilities to respective thresholds, for example, to determine whether to conclude with a desired confidence that the guest 408 is checking out. The comparison of the output probability for the presence of a person to the probability threshold for a person may be performed in Step 610 of FIG. 6 and the comparison of the output probability for the presence of a bag to the probability threshold for the presence of a bag may be performed in Step 612 of FIG. 6, for example.

In one example, the probability or confidence threshold for the presence of a person and the probability threshold for the presence of a bag in the video stream is at least 60%. The threshold may be in a range of from 60% to 95%, such as at least 85% or at least 90%, for example. In the example described above the probability for detection of a person is set at 90%. The probability thresholds for detection of a person and detection of a bag may be different. For example, in another example, the threshold for the detection of a bag may be at least 40%, such as at least 50% or at least 60%. In another example, the probability thresholds for both the presence of a person and the presence of a bag may be 70%. In another example, the probability threshold may be 70% for the presence of a person and 60% for the presence of a bag. It is noted that where a guest is requested to verify that they have checked out, probability thresholds for a bag may be lower than if the guest is not asked to verify that they have checked out. In addition, the probabilities may be dependent on the number of sub-regions analyzed by the CNN 700.

To train the CNN 700, a multi-part loss function may be optimized in a CNN model (not shown), as is known in the art. The CNN model may also be a Darknet framework, for example, as described above. The convolutional layers 702a, 702b, 702c, 702d . . . 702x, 702y may be pretrained with an ImageNet 1000-class competition dataset, for example. An example of the ImageNet 1000-class competition dataset is described in O. Russakovsky, J. Deng, H. Su, J. Krause, S. Satheesh, S. Ma, Z. Huang, A. Karpathy, A. Khosla, M. Bernstein, A. C. Berg, and L. Fei-Fei, "ImageNet Large Scale Visual Recognition Challenge. International Journal of Computer Vision (IJCV)," 2015, for example. The first 24 convolutional layers 702a, 702b, 702c, 702d . . . 702x, 702y of the CNN 700 may be pretrained in the model, for example. An average pooling layer and/or one or both fully connected layers 704a, 704b may also be included in the model for training, as is known in the art.

The CNN model may be trained for about one week to achieve a single crop top-5 accuracy of 88% on the ImageNet 2012 validation set, for example. This accuracy is comparable to the GoogLeNet models in Caffe's Model Zoo, as described in D. Mishkin, "Models accuracy on imagenet 2012 val," https://github.com/BVLC/caffe/wiki/ Models-accuracy-on-ImageNet-2012-val, for example.

The trained CNN model is evaluated on the PASCAL Visual Object Classes ("VOC") detection dataset, which provides a standard dataset of images and annotation, and standard evaluation procedures, as is known in the art. The PASCAL VOC is described in M. Everingham, S. M. A. Eslami, L. Van Gool, C. K. I. Williams, J. Winn, and A. Zisserman, "The pascal visual object classes challenge: A retrospective," International Journal of Computer Vision, 111(1):98-136, January 2015, for example.

The output of the CNN model may be optimized for sum-squared error, for example. Sum-squared error is used in this example because it is easy to optimize.

About 135 epochs in the training and validation data sets from PASCAL VOC 2007 and PASCAL VOC 2012 may be run on the CNN model. When evaluating the CNN model on PASCAL VOC 2012, the VOC 2007 test data may also be used for training. In one example, a batch size of 64, a momentum of 0.9, and a decay of 0.0005 are used during training.

On PASCAL VOC, the network predicts 98 bounding boxes per image and class probabilities for each box. This approach is extremely fast at test time since it only requires a single network evaluation, unlike classifier-based methods. The grid design enforces spatial diversity in the bounding predictions. Often it is clear which grid cell an object falls into and the network only predicts one box for each object. However, some large objects or objects near the border of multiple cells may be well localized by multiple cells. Non-maximal suppression may be used to fix these multiple detections. While not critical to performance, it has been found that non-maximal suppression adds 2-3% in mAP.

After evaluation, the trained CNN model is converted to the CNN 700 to perform detection. As in training, predicting detections for a test image during evaluation only requires one pass through the CNN 700. Additional passes may be run, if desired.

While examples of embodiments are described above, it would be understood by one of ordinary skill in the art that variations may be introduced that are within the spirit and scope of the inventions, which are defined by the following claims.

What is claimed is:

1. A method for managing a hospitality workflow in a hotel, comprising:
   receiving notification that a current day is a checkout day for a guest in a hotel room;
   if notification that the current day is a checkout day is received, taking at least one image of a region in front of a hotel room door of a hotel room, after the hotel room door is opened, by a camera;
   analyzing the at least one image of the region for a presence of a person, by a first processing device;
   analyzing the at least one image of the region for a presence of a bag, by the first processing device;
   determining that the guest checked out of the hotel room based only on a detection of the person and a detection of the bag in the at least one image, on a checkout day; and
   informing a housekeeping department that the guest has checked out.

2. The method of claim 1, further comprising, when it is determined that the guest checked out:
   limiting electrical power or current provided to the room.

3. The method of claim 1, wherein the hotel room door comprises a door lock system including the first processing device.

4. The method of claim 3, further comprising:
   informing, by the first processing device, a second processing device separate from the first processing device that the guest checked out, via a network, the second processing device being part of a hotel management system; and
   informing the hospitality department that the guest checked out by the second processing device.

5. The method of claim 1, further comprising controlling a temperature in a hotel room when it is determined that the guest checked out of the hotel room.

6. The method of claim 1, further comprising:
   informing the housekeeping department that the guest has checked out only if the guest confirms the checkout.

7. The method of claim 1, further comprising:
   detecting that the hotel room door is opened, by the first processing device; and
   turning on the camera after detecting that the door is opened.

8. The method of claim 1, comprising analyzing the image by an object identification and classification algorithm.

9. The method of claim 8, wherein the object identification and classification algorithm comprises a convolutional neural network.

10. The method of claim 1, comprising imaging for a period of time to generate a video of the region in front of the door.

11. The method of claim 1, wherein the hotel door includes a door lock, the method further comprising:
    retrofitting the door lock to include the camera and the first processing device by inserting a card or substrate supporting the camera into a slot in the door lock configured to receive a hotel key card.

12. The method of claim 1, further comprising, after determining that the guest checked out of the room, sending a message to the guest requesting confirmation that the guest has checked out, via a network; and
    informing a housekeeping department that the guest has checked out, if the guest confirmed the checkout.

13. A system for managing a hospitality workflow in a hotel, comprising:
    a hotel management system comprising a first processing device;
    a camera positioned to image a region in front of a door of a hotel room; and
    a door lock system attached to the door, the door lock system comprising a second processing device in communication with the hotel management system via a network;
    wherein the first processing device is configured to inform the second processing device that a current day is a checkout day; and
    the second processing device is configured to:
      cause the camera to image a region in front of a hotel room door on the checkout day, after the door is opened;
      analyze the image of the region for a presence of a person;
      analyze the image of the region for presence a bag; and
      determine that the guest checked out of the room only based on the detection of the person and the detection of the bag by the first processing device or the second processing devices on the checkout day;
    wherein, after the first processing device determines that the guest checked out of the room, the first processing device and/or second processing device is configured to send a message to the guest to confirm that the guest has checked out.

14. The system of claim 13, wherein the second processing device is configured to determine that the guest checked out only if a person is detected and a bag are detected on the checkout day.

15. The system of claim 13, wherein, if it is determined that the guest checked out, the first processing device is configured to:
    inform a hospitality system, an accounting department, and/or a billing department of the hotel that the guest checked out.

16. The system of claim 13, wherein, if it is determined that the guest checked out, the first processing device is configured to control operation of:
    a light, a TV, a room thermostat, an air conditioning system, a heating system, a fan, and/or coffee machine in the hotel room.

17. The system of claim 13, wherein:
    the camera is further configured to read a QR code displayed on a smart device of a guest; and
    the second processing device or the first processing device is further configured to:
    compare data in the QR code to stored data; and
    if the data in the QR code matches the previously received stored data, causing the door lock system to open to allow a guest to enter the hotel room.

18. The system of claim 13, wherein the camera is part of the door lock system.

19. A door lock system for a door of a hotel room, comprising:
    a casing to be attached to a door, the casing including a slot configured to receive a room key;
    a motor coupled to a latch bolt;
    a camera supported by a card or substrate received in the slot, wherein, when the card or substrate is received in the slot, the camera is positioned to face outward from the door;

a processing device configured to:
control operation of the camera to record at least one image when a person leaves the hotel room on a checkout day;
analyze the at least one image for the presence of a person and the presence of a bag; and
determine whether the guest checked out on the checkout day based on analysis of the at least one image.

20. The door lock system of claim 19, further comprising a proximity sensor to detect a presence in front of the door;
wherein the processing device is configured to:
turn on the camera to read the QR code image based on the detection of the presence by the proximity sensor.

21. The door lock system of claim 19, wherein the processing device is supported by the card or substrate.

22. A method for allowing a guest to enter a room of a hotel, comprising:
generating a QR code by a first processing device of a hotel management system based on a unique, one-time key;
generating a QR code image including the QR code, by the first processing device;
providing the QR code image to a smart device of the guest for storage on the smart device;
reading the stored QR code image displayed by the smart device by a QR code reader or scanning device;
comparing data in the read QR code image to stored data;
unlocking a lock of the door if the data matches the stored data including the unique, one-time key; and
if the door has been unlocked, providing a new QR code image to the smart device for storage on the smart device of the guest.

23. The method of claim 22, further comprising:
generating the unique, one-time key by the first processing device;
storing the unique key by the first processing device, in storage of the hotel management system; and
providing the QR code image to the smart device by the first processing device, via a network.

24. The method of claim 23, further comprising:
receiving the generated unique key from the hotel management system by a door lock system including a second processing device, wherein the stored data comprises the unique key; and
comparing the unique key, from the read QR code image, to the stored unique key, by the first processing device.

25. The method of claim 23, further comprising providing the QR code image to the smart device in response to a request to check-in to the hotel made via an App on the smart device by the guest.

26. The method of claim 23, wherein the stored data is stored by the hotel management system, the method comprising:
receiving the unique key from the read QR code image by the first processing device, via a network; and
comparing the unique key to the stored data, by the first processing device.

27. The method of claim 22, wherein the QR code reader or scanning device is a camera and reading the QR code image comprises:
detecting a presence in front of the door by a proximity sensor; and
turning on the camera to read the QR code image based on the detection of the presence by the proximity sensor.

28. The method of claim 22, comprising:
generating the QR code based on the unique, one-time key and at least one item of personal identifying information of the guest; and
unlocking the lock of the door if the data matches the stored data including the unique, one-time key and the at least one item of personal identifying information of the guest.

29. The method of claim 28, wherein the at least one item of personal identifying information of the guest is a name of the guest, an address of the guest, and/or a phone number of the guest, and comparing comprises:
comparing the unique key and the at least one data item to the stored data.

30. The method of claim 22, comprising:
generating the QR code based on the unique, one-time key and information related to the hotel; and
unlocking the lock of the door if the data matches the stored data including the unique, one-time key and the information related to the hotel.

31. A method for allowing a guest to enter a room of a hotel, comprising:
generating a QR code by a first processing device of a hotel management system, based on a unique, one-time key and information related to the hotel;
generating a QR code image including the QR code, by the first processing device;
providing the QR code image to a smart device of the guest for storage on the smart device;
reading the stored QR code image displayed by the smart device by a QR code reader or scanning device;
comparing data in the read QR code image to stored data;
unlocking a lock of the door if the data matches the stored data including the unique, one-time key and the information related to the hotel; and
if the door has been unlocked, providing a new QR code image to the smart device for storage on the smart device of the guest.

32. The method of claim 31, wherein the information related to the hotel includes a name of the hotel and/or a room number of the hotel assigned to the guest.

* * * * *